(12) United States Patent
Engel et al.

(10) Patent No.: US 9,627,141 B2
(45) Date of Patent: Apr. 18, 2017

(54) CERAMIC MULTI-LAYERED CAPACITOR

(71) Applicant: EPCOS AG, Munich (DE)

(72) Inventors: Günter Engel, Leibnitz (AT); Michael Schossmann, Deutschlandsberg (AT); Markus Koini, Seiersberg (AT); Andrea Testino, Genoa (IT); Christian Hoffmann, Artemisu Kozu (JP)

(73) Assignee: EPCOS AG, Munich (DE)

( * ) Notice: Subject to any disclaimer, the term of this patent is extended or adjusted under 35 U.S.C. 154(b) by 0 days.

(21) Appl. No.: 14/399,860

(22) PCT Filed: Apr. 11, 2013

(86) PCT No.: PCT/EP2013/057614
§ 371 (c)(1),
(2) Date: Nov. 7, 2014

(87) PCT Pub. No.: WO2013/167338
PCT Pub. Date: Nov. 14, 2013

(65) Prior Publication Data
US 2015/0103466 A1 Apr. 16, 2015

(30) Foreign Application Priority Data
May 8, 2012 (DE) .......... 10 2012 104 033

(51) Int. Cl.
*H01G 4/30* (2006.01)
*H01G 4/232* (2006.01)
(Continued)

(52) U.S. Cl.
CPC .............. *H01G 4/30* (2013.01); *B32B 18/00* (2013.01); *C04B 35/493* (2013.01);
(Continued)

(58) Field of Classification Search
CPC .. H01G 4/12; H01G 4/30; H01G 4/06; H01G 4/232
(Continued)

(56) References Cited

U.S. PATENT DOCUMENTS 4,584,629 A 4/1986 Garcia et al.
6,052,272 A 4/2000 Kuroda et al.
(Continued)

FOREIGN PATENT DOCUMENTS

CN 101795994 A 8/2010
CN 102070334 A 5/2011
(Continued)

OTHER PUBLICATIONS

"Multilayer Ceramic Chip Capacitor—CGK Series; Commercial Grade; MEGACAP Type," TDK Corporation of America, Datasheet, Oct. 2013, 10 pages.
(Continued)

*Primary Examiner* — Nguyen Ha
(74) *Attorney, Agent, or Firm* — Slater Matsil, LLP

(57) ABSTRACT

A ceramic multi-layer capacitor includes a main body, which has ceramic layers arranged along a layer stacking direction to form a stack, and first and second electrode layers arranged between the ceramic layers. The multi-layer capacitor also includes a first external contact-connection arranged on a first side surface of the main body and electrically conductively connected to the first electrode layers, and a second external contact-connection arranged on a second side surface (62) of the main body (2). The second side surface is situated opposite the first side surface and is electrically conductively connected to the second electrode layers.

13 Claims, 1 Drawing Sheet

(51) Int. Cl.
*B32B 18/00* (2006.01)
*C04B 35/493* (2006.01)
*H01G 4/248* (2006.01)
*H01G 4/12* (2006.01)

(52) U.S. Cl.
CPC .......... *H01G 4/1245* (2013.01); *H01G 4/232* (2013.01); *H01G 4/248* (2013.01); *C04B 2235/3201* (2013.01); *C04B 2235/3224* (2013.01); *C04B 2235/3225* (2013.01); *C04B 2235/3227* (2013.01); *C04B 2235/3262* (2013.01); *C04B 2235/3275* (2013.01); *C04B 2235/3279* (2013.01); *C04B 2235/3281* (2013.01); *C04B 2235/3291* (2013.01); *C04B 2235/768* (2013.01); *C04B 2237/346* (2013.01); *C04B 2237/704* (2013.01); *H01G 4/12* (2013.01)

(58) Field of Classification Search
USPC ......... 361/321.1, 301.2, 301.4, 321.2, 306.1, 361/306.2
See application file for complete search history.

(56) References Cited

U.S. PATENT DOCUMENTS

| | | | |
|---|---|---|---|
| 6,134,098 A † | 10/2000 | Kuroda | |
| 6,473,291 B1 | 10/2002 | Stevenson | |
| 6,613,705 B1 | 9/2003 | Feltz et al. | |
| 6,621,682 B1 | 9/2003 | Takakuwa et al. | |
| 7,336,475 B2 | 2/2008 | Bultitude et al. | |
| 7,414,857 B2 † | 8/2008 | Ritter | |
| 7,781,358 B2 | 8/2010 | Hackenberger et al. | |
| 7,808,770 B2 | 10/2010 | Itamura et al. | |
| 8,125,762 B2 † | 2/2012 | Bultitude | |
| 8,209,828 B2 | 7/2012 | Feltz et al. | |
| 8,282,755 B2 | 10/2012 | Schossmann et al. | |
| 8,776,364 B2 | 7/2014 | Florian et al. | |
| 9,293,256 B2 | 3/2016 | Engel et al. | |
| 2008/0049377 A1 | 2/2008 | Sutardja | |
| 2008/0165468 A1 | 7/2008 | Berolini et al. | |
| 2008/0174931 A1 | 7/2008 | Skamser et al. | |
| 2009/0154055 A1 | 6/2009 | Takashima et al. | |
| 2010/0219724 A1 | 9/2010 | Schossmann et al. | |
| 2010/0290173 A1 † | 11/2010 | Yoon et al. | |
| 2011/0111947 A1 * | 5/2011 | Natsui .................. | C01G 23/006 501/137 |
| 2011/0259502 A1 | 10/2011 | Schossmann et al. | |
| 2012/0113560 A1 | 5/2012 | Takashima et al. | |
| 2012/0281335 A1 | 11/2012 | Engel et al. | |

FOREIGN PATENT DOCUMENTS

| | | |
|---|---|---|
| DE | 19749858 C1 | 4/1999 |
| DE | 19841487 A1 | 3/2000 |
| DE | 10062672 A1 | 8/2001 |
| DE | 10345500 A1 | 4/2005 |
| EP | 0335358 A2 | 10/1989 |
| JP | 4357807 A | 12/1992 |
| JP | 2000106320 A | 4/2000 |
| JP | 2009170873 A | 7/2009 |
| JP | 2009527919 A | 7/2009 |
| JP | 2010537937 A | 12/2010 |
| WO | 2007117257 A1 | 10/2007 |
| WO | 2009034038 A2 | 3/2009 |
| WO | 2011085932 A1 | 7/2011 |

OTHER PUBLICATIONS

Chen, E., et al., "Ripple Current Confusion," KEMET Electronics Corp., Sep. 2004, 2 pages.

Clelland, I.W., "Recent Advances in Capacitor Technology with Application to High Frequency Power Electronics and Voltage Conversion," Paktron Division of Illinois Tool Works Inc., 14th Annual Applied Power Electronics Conference & Exposition (APEC), Mar. 1999, 7 pages.

Engel, G.F., "Effective Reduction of Leakage Failure Mode after Flex Cracking Events in X7R-type Multilayer Ceramic Capacitors (MLCCs) by using Internal Series Connection (MLSCs)," EPCOS OHG, Ceramic Multilayer Technology, Proceedings of the CARTS Europe, Bad Homburg, Germany, Sep. 2006, 12 pages.

Kageyama, T., Murata's Ceramic Capacitor Serves Next Series of Power Electronics, AEI, Technology Focus, Apr. 2007, pp. 31-33.

Kato, J., et al., "Dielectric Material in Lead-Based Perovskite and Fabrication Process for Multilayer Ceramic Capacitor with Copper Internal Electrode," American Ceramic Society, Ceramic Dielectrics, vol. 8, Jun. 1990, pp. 54-69.

Kubota, K., et al., "Ceramic Capacitors Aid High-Voltage Designs," Power Electronics Technology, May 2004, pp. 14-23.

Prymak, J., et al., "Ripple Current Capabilities," 2004 KEMET Technical Update, KEMET Electronics Corp., Aug. 2004, 5 pages.

Sawyer, E., "Low Inductance-Low Temp Rice DC Bus Capacitor Properties Enabling the Optimization of High Power Inverters," Inter. Power Electronics Conference, May 4-6, 2010, Nürnberg, Germany, 6 pages.

Schuler, S., "Schnell Geschaltet—Das Schaltverhalthen moderner IGBT optimieren," Leistungsbauteile und Stromversorgungen, elektronikJOURNAL, Nov. 2010, pp. 30-32. (partial translation).

Tsurumi, T., et al., "Size Effect of Barium Titanate and Computer-Aided Design of Multilayered Ceramic Capacitors," IEEE Transactions on Ultrasonics, Ferroelectrics, and Frequency Control, vol. 56, No. 8, Aug. 2009, pp. 1513-1522.

Vetter, H., "Mission Profile Based PCC Desgin for Integration into HEV Converter," EPCOS AG, CARTS Asia 2006, Oct. 9-13, 2006, Taipei, Taiwan, 10 pages.

Maher, G.H., "Effect of Silver Doping on the Physical and Electrical Properties of PLZT Ceramics," Journal of the American Ceramic Society, vol. 66, No. 6, Jun. 1983, pp. 408-413.

AVX Low Inductance Capacitors; cover sheet, pp. 1-12, information sheet; available as publication Nov. 2001; http://www.avx.com/docs/masterpubs/lica.pdf.†

\* cited by examiner
† cited by third party

CERAMIC MULTI-LAYERED CAPACITOR This patent application is a national phase filing under section 371 of PCT/EP2013/057614, filed Apr. 11, 2013, which claims the priority of German patent application 10 2012 104 033.8, filed May 8, 2012, each of which is incorporated herein by reference in its entirety.

TECHNICAL FIELD

A ceramic multi-layer capacitor which is preferably suitable for high-power applications is specified. The multi-layer capacitor can be used, for example, as a filter element in an AC/DC or DC/DC converter.

BACKGROUND

The International Publication WO 2011/085932 A1, U.S. counterpart 2012/0281335 A1, describes a capacitor comprising a heating element and also a capacitor region with dielectric layers and internal electrodes arranged between the layers, wherein the heating element and the capacitor region are thermally conductively connected to one another.

SUMMARY

At least some embodiments specify a ceramic multi-layer capacitor which has improved properties, such as, for example, a particularly low ESR value (equivalent series resistance), in comparison with known multi-layer capacitors.

A ceramic multi-layer capacitor in accordance with at least one embodiment comprises a main body. The main body preferably has a cuboidal shape. The main body comprises dielectric layers arranged along a layer stacking direction to form a stack. The dielectric layers are preferably embodied as ceramic layers. Furthermore, the main body comprises first and second electrode layers arranged between the ceramic layers. By way of example, in each case one first and one second electrode layer can be arranged at a distance from one another in an identical layer plane. Furthermore, the first and second electrode layers can be arranged in each case in different layer planes of the stack.

In accordance with a further embodiment, the main body comprises a first external contact-connection. Preferably, the external contact-connection is arranged on a first side surface of the main body and is electrically conductively connected to the first electrode layers. Preferably, the first electrode layers are directly electrically conductively connected to the first external contact-connection, that is to say that the first electrode layers directly adjoin the first external contact-connection and are directly connected to the first external contact-connection. The first electrode layers preferably extend as far as the first side surface.

Furthermore, the main body has a second external contact-connection, which is arranged on a second side surface of the main body, said second side surface being situated opposite the first side surface, and is electrically conductively connected to the second electrode layers. Preferably, the second electrode layers are directly electrically conductively connected to the second external contact-connection, that is to say that the second electrode layers directly adjoin the second external contact-connection and are directly connected to the second external contact-connection. The second electrode layers preferably extend as far as the second side surface.

In accordance with a further embodiment, the main body has a width B along the layer stacking direction. In this case, B designates the spatial extent of the main body of the multi-layer capacitor along the layer stacking direction. Furthermore, the main body has a height H perpendicular to the first side surface. The height H can thus be understood as the spatial extent of the main body perpendicular to the first side surface of the main body. Preferably, the height H also runs perpendicular to the second side surface of the main body. Furthermore, the main body has a length L perpendicular to the height H and perpendicular to the layer stacking direction. Consequently, the length L designates the spatial extent of the main body in a direction perpendicular to the width B and to the height H.

In accordance with a further embodiment, the relationship $B/H \geq 0.2$ holds true for the ratio of the width B to the height H. In accordance with one preferred embodiment, $B/H \geq 0.3$ holds true. In accordance with a further preferred embodiment, $B/H \geq 1.0$ holds true. In accordance with one particularly preferred embodiment, $B/H \approx 0.35$ holds true.

In accordance with a further embodiment, $L/B \geq 1$ holds true for the ratio of the length L to the width B. Furthermore, $L/B \leq 5$ preferably holds true, and $L/B \leq 3.5$ particularly preferably holds true.

In accordance with a further embodiment, $L/H \geq 0.8$ holds true for the ratio of the length L to the height H. In accordance with one preferred embodiment, $L/H \geq 1$ holds true. In accordance with a further preferred embodiment, $L/H \geq 1.2$ holds true.

As a result of the ratios between the width B and the height H of the main body as specified here, in the case of a ceramic multi-layer capacitor described here, the ratio of the feed cross section of the electrode layers to the useful cross section, that is to say to the capacitance-determining area, can be significantly increased. What can be achieved as a result is that the ceramic multi-layer capacitor described here has a particularly low ESR value (equivalent series resistance). By way of example, a ceramic multi-layer capacitor described here, e.g. having a capacitance of between 4 µF and 10 µF, can have an ESR of between 3 mΩ and 5 mΩ during operation at a frequency of between 100 kHz and 1 MHz.

In accordance with a further embodiment, the main body has third electrode layers, which are electrically conductively connected neither to the first nor to the second external contact-connection. Preferably, the third electrode layers are not electrically conductively connected to any external contact-connection. Here and hereinafter, the third electrode layers can also be designated as floating electrodes.

In accordance with a further embodiment, the third electrode layers overlap the first electrode layers. In other words, the third electrode layers each have at least one partial region which, in an imaginary projection in the layer stacking direction of the stack, could be brought to congruence with at least one partial region of the first electrode layers. Furthermore, the third electrode layers can overlap the second overlap layers. By way of example, in each case one first and one second electrode layer can be arranged at a distance from one another in an identical layer plane of the main body and in each case overlap at least one third electrode arranged in a further layer plane.

The use of first, second and floating third electrode layers, that is to say the use of serial internal electrodes, advantageously brings about an increase in the breakdown field strength, which has a beneficial effect for the robustness and the reliability of the multi-layer capacitor. Furthermore, this makes it possible to reduce the dielectric layer thickness, that is to say the layer thickness of the ceramic layers, which as a consequence results in an increase in the cross section of an electrode layer per volume of ceramic and thus an improvement of the ESR value (equivalent series resistance) and an improvement of the current-carrying capacity of the component for application currents.

In accordance with a further embodiment, the ceramic layers have a layer thickness of between 3 µm and 200 µm. In accordance with a further preferred embodiment, the ceramic layers have a layer thickness of between 10 µm and 100 µm. Particularly preferably, the ceramic layers have a layer thickness of approximately 25 µm.

In accordance with a further embodiment, the electrode layers have a layer thickness of between 0.1 µm and 10 µm. In accordance with one preferred embodiment, the electrode layers have a layer thickness of between 1 µm and 4 µm. Particularly preferably, the electrode layers have a layer thickness of approximately 3.5 µm.

In accordance with a further embodiment, the main body has at least ten ceramic layers. In accordance with a further embodiment, the main body has at least ten first electrode layers. In accordance with a further embodiment, the main body has at least ten second electrode layers.

In accordance with a further embodiment, the following relationship holds true for the number of first electrode layers provided in the main body and the width B of the main body: ratio of the number of first electrode layers to the width B≥10/mm. In other words, the main body has at least ten first electrode layers per mm width. Furthermore, the main body preferably has at least ten second electrode layers per mm width.

In accordance with a further embodiment, the electrode layers comprise a base metal. The electrode layers preferably comprise copper. In accordance with one preferred embodiment, the electrode layers consist of copper. In particular after the sintering of the multi-layer capacitor, the electrode layers can consist of pure copper. On account of the high thermal and electrical conductivity of copper, a particularly small ESR value (equivalent series resistance) can be obtained in the case of the multi-layer capacitor described here. Furthermore, the process for producing the multi-layer capacitor can advantageously be made less expensive by virtue of the use of base metals.

In accordance with a further embodiment, the first and second side surfaces are surface-treated. By way of example, the first and second side surfaces can be lapped. Furthermore, it is possible for the first and second side surfaces to be ground, scoured or plasma-etched. Advantageously, a particularly good contact between the external contact-connections and the first and respectively second electrode layers can be achieved by means of the surface-treated side surfaces. In particular, by means of the surface treatment of the first and second side surfaces, ceramic material present between individual first electrode layers and respectively between individual second electrode layers can be drawn back, such that the first and second electrode layers can be brought to the surface of the main body reliably in terms of process engineering. By way of example, the external contact-connections can then be applied without firing a gas flow, for example by a standard sputtering process.

In accordance with a further embodiment, the first and second external contact-connections each have at least one first sputtering layer, wherein the first sputtering layers are in direct contact with the first or second electrode layers. Preferably, a first sputtering layer is applied on the first side surface of the main body, and is in direct contact with exit surfaces of the first electrode layers from the main body.

Likewise, a first sputtering layer can be applied on the second side surface of the main body, and is in direct contact with exit surfaces of the second electrode layers from the main body. The sputtering layers can have a layer thickness of between 0.1 µm and 1.5 µm, for example. Preferably, the first sputtering layers comprise chromium or consist of chromium.

In accordance with a further embodiment, the first and second external contact-connections each have a second sputtering layer, wherein the second sputtering layers are preferably applied directly on the first sputtering layers. The second sputtering layers preferably comprise copper or consist of copper.

In accordance with a further embodiment, the first and second external contact-connections each have a third sputtering layer, wherein the third sputtering layers are preferably applied directly on the second sputtering layers. The third sputtering layers preferably comprise gold or consist of gold. Alternatively, the third sputtering layers can also comprise silver or consist of silver.

In accordance with a further embodiment, the ceramic layers comprise a ceramic material for which the following formula holds true:

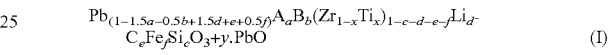

$$Pb_{(1-1.5a-0.5b+1.5d+e+0.5f)}A_aB_b(Zr_{1-x}Ti_x)_{1-c-d-e-f}Li_d\text{-}C_eFe_fSi_cO_3+y.PbO \quad (I)$$

wherein A is selected from the group consisting of La, Nd, Y, Eu, Gd, Tb, Dy, Ho, Er and Yb; B is selected from the group consisting of Na, K and Ag; and wherein C is selected from the group consisting of Ni, Cu, Co and Mn; where $0<a<0.12$; $0.05≤x≤0.3$; $0≤b≤0.12$; $0≤c<0.12$; $0≤d<0.12$; $0≤e≤0.12$; $0≤f<0.12$; $0≤y<1$, wherein $b+d+e+f>0$.

Preferably, a particularly Zr-rich PZT solid-solution phase is selected from the phase diagram. Moreover, the condition $b+d+e+f>0$ stipulates that the ceramic material must contain at least one element from the group consisting of Li, Na, K, Ag, Fe, Ni, Cu, Co and Mn (lithium, iron and groups B and C) besides a dopant from the defined group A (rare earth element). As a result, a ceramic material which is sinterable at temperatures of 1000° C. to 1120° C. can be provided, which enables a combination with other substances/materials, not stable at relatively high temperatures, as early as during the method for producing the ceramic material. By way of example, it becomes possible to sinter the ceramic material ("co-firing" method) with electrode layers composed of base metals, such as silver or copper, for instance. Moreover, the ceramic material has a higher switching field strength and/or higher relative permittivity (dielectric constant) compared with the PZT material doped only by group A.

Moreover, low sintering temperatures promote the formation of small grain sizes of the ceramic material, which has a favorable influence on the dielectric properties. More precisely, the dielectric properties of PZT ceramics are generally also determined by the domain size. Domains are understood to mean regions in the ceramic with the same polarization. The domain size is dependent on the grain size. The number of domains per grain increases as the grain size increases. The changed domain size has consequences for the material properties of the ceramic. It is thus desirable to be able to control the grain size or grain growth.

Preferably, the doped lead zirconate titanate ceramic has a perovskite lattice, which can be described by the general formula $ABO_3$, wherein A denotes the A-sites and B denotes the B-sites of the perovskite lattice.

The perovskite lattice is distinguished by a high tolerance toward dopings and vacancies.

The perovskite structure of lead zirconate titanate (PZT) can be described by the general formula $ABO_3$. A unit cell of the PZT crystal lattice can be described by a cube. The A-sites are occupied by $Pb^{2+}$ ions situated on the corners of the cube. An $O^{2-}$ ion is in each case situated in the center of each cube face. A $Ti^{4+}$ ion and a $Zr^{4+}$ ion (B-sites) are situated in the center of the cube. This structure has a high tolerance toward substitution of the metal ions by other metal ions and defects, for which reason it can be doped well.

Distortion of the highly symmetrical coordination polyhedron can occur depending on the difference in size between the ion introduced by doping and the substituted ion. This distortion can change the center of symmetry of the crystal and thus influence the polarizability.

The different doping possibilities can be classified on the basis of the valency of the doping ion. Isovalent doping, that is to say the substitution of one ion by another ion having the same valency, does not affect possible vacancies in the ceramic material. If cations of low valency (acceptors) replace cations having a higher valency, then vacancies are generated in the anion lattice. Cations of higher valency (donors), if they replace cations of lower valency, cause vacancies in the cation lattice. Doping with acceptors and donors leads in each case to characteristic changes in the material properties. Acceptor-doped ceramics are also designated as "hard" ceramics, and donor-doped ceramics as "soft" ceramics.

A doping, for example, with $Nd^{3+}$ (or some other rare earth element from group A), on the A-sites constitutes a donor doping. On account of the ionic radius of neodymium, the latter is incorporated on the $Pb^{2+}$ sites. Charge equalization takes place as a result of the corresponding formation of Pb vacancies. The doping brings about metric changes in the lattice and the influencing of longer-acting interactions between the unit cells.

A doping, for example, with $K^+$ or $Fe^{3+}$, on the A- or B-sites, constitutes an acceptor doping. On account of the ionic radius of potassium, the latter is incorporated on the $Pb^{2+}$ sites, while $Fe^{3+}$ is incorporated on the $Zr^{4+}$ or $Ti^{4+}$ sites. The charge equalization takes place as a result of the reduction of $Pb^{2+}$ vacancies (A-vacancies) and/or the corresponding formation of oxygen vacancies. The doping brings about grain growth and oxygen vacancy formation which provides sintering densification and which is induced by K acceptors at the sintering temperature. In the cooling process, recombination with the Nd donors with the formation of quasi-neutral {Nd/K} defect pairs can take place, such that no or only a very low lead or oxygen vacancy concentration is present in the finished ceramic.

This doping affects the grain growth of the material, which is dependent on the concentration of the introduced doping. In this case, small amounts of doping contribute to the grain growth, whereas excessively large amounts of doping ions can inhibit the grain growth.

The properties of donor-doped PZT materials, such as are present in the case where Nd occupies Pb sites, are substantially based on an increased domain mobility caused by the Pb vacancies. The vacancies have the effect that the domains can already be influenced by small electric fields. This leads to an easier displaceability of the domain boundaries and thus to higher dielectric constants in comparison with undoped PZT ceramics.

Acceptor and donor dopings are present simultaneously in the ceramic material. This has the effect that the negative properties which occur when the ceramic was doped with only one of the two types of doping are compensated for. By way of example, if only an acceptor doping were present, then this often leads to decreasing dielectric constants, that is to say that the constants are less than those of the undoped ceramic. If only a donor doping is present, then the grain growth is inhibited and the grains of the ceramic do not attain the desired size. The present combination of the dopings contrasts positively with the undoped ceramic in these points, however. It has higher dielectric constants, which is the case even at lower sintering temperatures.

In accordance with one preferred embodiment, $0.1 \leq x \leq 0.2$ holds true, since the polarization curves can be set better in this range.

In accordance with a further embodiment, it holds true that $0 \leq y < 0.05$.

In accordance with a further embodiment, it holds true that $0.001 < b < 0.12$, wherein with further preference $d = e = f = 0$ holds true.

In accordance with a further embodiment, it holds true that $0.001 < e < 0.12$, wherein with further preference $b = d = f = 0$ holds true.

In accordance with a further embodiment, B is sodium (Na). The material properties are influenced particularly advantageously as a result of this; in particular, the sintering temperature is reduced in comparison with PZT material containing only a rare earth element, and the switching field strength is increased at the same time.

In accordance with a further preferred embodiment, the relative permittivity at an electric field strength of 1 kV/mm, preferably 2 kV/mm, is at least 60% of the relative permittivity at an electric field strength of 0 kV/mm. With further preference, the relative permittivity (dielectric constant) of the ceramic material at a field strength of 2 to 5 kV/mm, preferably 1 kV/mm to 10 kV/mm, is at least 60% of the relative permittivity at an electric field strength of 0 kV/mm. The measurements are preferably carried out at a temperature of the ceramic material of 125° C.

In accordance with a further preferred embodiment, the ceramic material has a relative permittivity of at least 500, preferably at least 1500, at an electric field strength of 1 kV/mm, preferably 2 kV/mm. With further preference, the ceramic material has a relative permittivity of at least 500, preferably at least 1500, at an electric field strength of 2 to 5 kV/mm, preferably 1 kV/mm to 10 kV/mm. The measurements are preferably carried out at a temperature of the ceramic material of 125° C.

The measurement of polarization hysteresis is a standard method for determining the relative permittivity (dielectric constant). For frequency-independent measurement, quasi-static methods are known wherein the hysteresis loop is measured point by point. By way of example, polarization measurements can be carried out with the aid of the TF Analyser 2000 from aixACCT Systems GmbH.

In accordance with a further preferred embodiment, the ceramic material is an antiferroelectric dielectric. For this purpose, the basic material PZT is preferably used from the antiferroelectric-orthorhombic phase region (O-phase). The antiferroelectric order is characterized by a superimposition of a plurality of polar sublattices, the electric dipole moments of which cancel one another out. An antiferroelectric crystal thus has no spontaneous polarization, but does have special dielectric properties. If an electric field is applied to the antiferroelectric, it behaves firstly like a linear dielectric. Starting from a specific critical field strength, an abrupt transition to the ferroelectric phase is induced and the formerly antiparallel dipoles flip over to the then energetically more expedient, parallel, orientation. By contrast, the opposite transition takes place at a lower field strength. This results in a so-called double hysteresis loop.

Antiferroelectric ceramic materials have a less highly pronounced polarization-field strength hysteresis compared with ferroelectric ceramic materials. This results in lower energetic losses in the case of use in capacitors. For this reason, the use of antiferroelectric ceramic materials is preferred.

In order to produce pure and differently doped lead zirconate titanate (PZT) powders, it is possible to use the traditional mixed oxide method or else solvent-based methods, also called "sol-gel" methods. The starting point is e.g. solutions of the acetates or alkoxides of the constituent metals, which are converted into granulated xerogels, the ceramic precursor substances, by various drying methods. By way of example, spray drying and spray freeze granulation with subsequent freeze drying are available for the drying. The precursors are subsequently pyrolyzed to form the oxides. Powders produced in this way can be deagglomerated with little outlay and be conditioned for further processing.

A ceramic multi-layer capacitor described here is distinguished, in particular, by a particularly low ESR value (equivalent series resistance) and a particularly low ESL value (equivalent series inductance).

At the same time, the herein described arrangement of the electrode layers is expedient for process implementation during the production of a multi-layer capacitor described herein. Both binder removal and sintering necessitate a gas exchange/equilibrium of binder removal products and process gases, which is fostered in the case of the multi-layer capacitor described herein. By the electrode layers that are relatively short in the lateral direction, the construction promotes an improved possibility for process implementation, whereby as a consequence ceramic parts are possible which are relatively, measured against conventional multi-layer capacitors, large even in terms of the volume. Furthermore, in the case of a multi-layer capacitor described herein, synergistic effects result from the described arrangement of the electrode layers and the chosen ceramic material of the ceramic layers, which have a positive effect on the ESR value, the ESL value and the mechanical and thermal robustness. In particular, the combination of the ceramic together with the above-indicated aspect ratios between B, H and L and with the geometry of the electrode layers can improve the electrical and thermal properties of the component. In this regard, by way of example, the short paths that can be taken by the current through the electrodes (geometry effect) together with the thermal stability of the insulation resistance (ceramic property) have an extremely positive effect on the current-carrying capacity behavior of the component.

BRIEF DESCRIPTION OF THE DRAWINGS

Further advantages and advantageous embodiments of the ceramic multi-layer capacitor will become apparent from the embodiments described below in association with FIGS. 1 and 2.

In the figures.

In the exemplary embodiments and figures, identical or identically acting constituent parts may be provided in each case with the same reference signs. The illustrated elements and their size relationships among one another should not be regarded as true to scale, in principle. Rather, individual elements, such as, for example, layers, components and regions, may be illustrated with exaggerated thickness or size dimensions in order to enable better illustration and/or in order to afford a better understanding.

DETAILED DESCRIPTION OF ILLUSTRATIVE EMBODIMENTS

Figure 1:
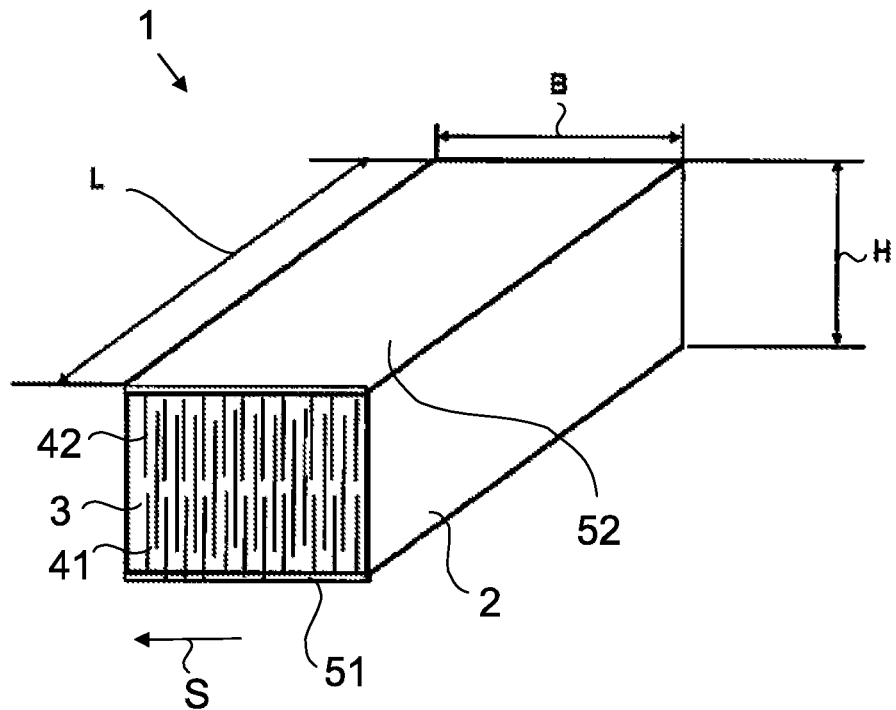
FIG. 1 shows a perspective schematic view of a ceramic multi-layer capacitor in accordance with one embodiment.
Figure 2:
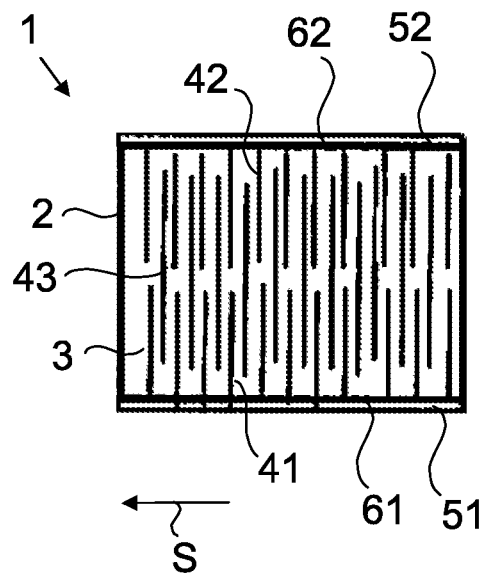
FIG. 2 shows a cross section of the ceramic multi-layer capacitor from FIG. 1.

FIGS. 1 and 2 show different schematic views of a ceramic multi-layer capacitor 1 in accordance with one exemplary embodiment. The multi-layer capacitor 1 comprises a main body 2 having a cuboidal shape having six side surfaces. The main body 2 has ceramic layers 3 and first and second electrode layers 41, 42 arranged between the ceramic layers 3, wherein the ceramic layers 3 and the electrode layers 41, 42 are arranged along a layer stacking direction S to form a stack. In particular, the main body 2 has at least 10 first and at least 10 second electrode layers 41, 42. In the exemplary embodiment shown, the ceramic layers 3 have a layer thickness of approximately 25 µm. The electrode layers 41, 42 have a layer thickness of approximately 3.5 µm. Alternatively, the ceramic layers 3 and the electrode layers 41, 42 can also have other layer thicknesses.

The electrode layers comprise copper in the exemplary embodiment shown. What can be achieved as a result is that, firstly, the multi-layer capacitor 1 has the lowest possible ESR value and, secondly, the process for producing the multi-layer capacitor 1 can be made less expensive.

The multi-layer capacitor 1 furthermore comprises a first external contact-connection 51, which is arranged on a first side surface 61 of the main body 2, and a second external contact-connection 52, which is arranged on a second side surface 62 of the main body 2. In this case, the first electrode layers 41 are electrically conductively connected to the first external contact-connection 51 and the second electrode layers 42 are electrically conductively connected to the second external contact-connection 52. The first and second side surfaces 61, 62 are surface-treated, wherein the surface treatment is preferably carried out before the external contact-connections 51, 52 are applied. In particular, the first and second side surfaces 61, 62 can be lapped, scoured, ground or plasma-etched. By the surface-treated side surfaces 61, 62, it is advantageously possible to achieve a particularly good contact between the external contact-connections 51, 52 and the first and respectively second electrode layers 41, 42.

In the exemplary embodiment shown, in each case one first and one second electrode layer 41, 42 are arranged at a distance from one another in an identical plane. Said plane is formed by a layer plane formed perpendicularly to the layer stacking direction S of the stack. In this case, there is a so-called gap between the first electrode layers 41 and the second electrode layers 42. Said gap constitutes a region between a first electrode layer 41 and a second electrode layer 42 in the layer plane in which no electrode layers are arranged. In accordance with an alternative exemplary embodiment, it is also possible for the first and second electrode layers 41, 42 to be arranged in each case in different layer planes.

The main body 2 furthermore has third electrode layers 43, which are electrically conductively connected neither to the first nor to the second external contact-connection 51, 52. The third electrode layers 43 overlap both the first and the second electrode layers 41, 42, that is to say that the third electrode layers 43 each have at least one partial region which, in an imaginary projection in the layer stacking direction S of the stack, could be brought to congruence with at least one partial region both of the first and of the second electrode layers 41, 42. In accordance with the alternative exemplary embodiment in which the first and second electrode layers 41, 42 are arranged in each case in different layer planes, it is possible for the first and second electrode layers 41, 42 to overlap one another.

The first and second external contact-connections 51, 52 each have a first sputtering layer, wherein the first sputtering layers are in each case applied directly on the main body 2. In this case, the first sputtering layers are in direct contact with the first and respectively second electrode layers 41, 42. The first sputtering layers preferably comprise chromium. Second sputtering layers are in each case applied on the first sputtering layers, wherein the second sputtering layers preferably comprise copper. Furthermore, third sputtering layers, which preferably comprise gold, are in each case applied on the second sputtering layers. Alternatively, the third sputtering layers can also comprise silver.

The main body 2 has a width B along the layer stacking direction S. In other words, B denotes the extent of the main body 2 in a direction parallel to the layer stacking direction S. Preferably, at least 10 first electrode layers and at least 10 second electrode layers are provided in the main body 2 per mm width B of the main body. Furthermore, the main body 2 has a height H perpendicular to the first side surface 51. That is to say that, perpendicular to the first side surface 51, the main body 2 has an extent corresponding to the height H. Furthermore, the main body 2 has a length L perpendicular to the height H and perpendicular to the layer stacking direction S, said length corresponding to the extent of the main body 2 perpendicular to the layer stacking direction and perpendicular to the height H. B/H≥0.2 holds true for the ratio of the width B to the height H of the main body 2. Furthermore, L/B≥1 holds true for the ratio of the length L to the width B of the main body, and L/H≥1 holds true for the ratio of the length L to the height H of the main body.

In the exemplary embodiment shown, the main body 2 has a width B of approximately 2.5 mm, a height H of approximately 7.0 mm and a length L of approximately 7.0 mm. Consequently, in the exemplary embodiment shown, the ratio B/H is approximately equal to 0.36. The ratio L/B is approximately 2.8 and the ratio L/H is approximately 1.0.

The multi-layer capacitor 1 in accordance with the exemplary embodiment shown is distinguished, in particular, by a low ESR value, a low ESL value and a high mechanical and thermal robustness. By way of example, the ceramic multi-layer capacitor (380V/10 μF) shown in the exemplary embodiment in accordance with FIGS. 1 and 2 has the following frequency-dependent values: ESR(min)=3 mΩ, ESR(100 kHz)=5 mΩ and ESL<4 nH. Furthermore, the multi-layer capacitor 1 can be produced cost-effectively.

The invention is not restricted to the exemplary embodiments by the description on the basis of said exemplary embodiments, but rather encompasses any novel feature and also any combination of features. This includes, in particular, any combination of features in the patent claims, even if this feature or this combination itself is not explicitly specified in the patent claims or exemplary embodiments.

The invention claimed is:

1. A ceramic multi-layer capacitor comprising:
    a main body including ceramic layers arranged along a layer stacking direction to form a stack, the main body further including first and second electrode layers arranged between the ceramic layers;
    a first external contact-connection arranged on a first side surface of the main body and electrically conductively connected to the first electrode layers; and
    a second external contact-connection arranged on a second side surface of the main body, the second side surface located opposite the first side surface and being electrically conductively connected to the second electrode layers,
    wherein the main body has a width B along the layer stacking direction,
    wherein the main body has a height H perpendicular to the first side surface,
    wherein the main body has a length L perpendicular to the height H and perpendicular to the layer stacking direction,
    wherein B/H≥0.2 holds true,
    wherein the ceramic layers comprise a ceramic material for which the following formula holds true:

$$Pb_{(1-1.5a-0.5b+1.5d+e+0.5f)}A_aB_b(Zr_{1-x}Ti_x)_{1-c-d-e-f}Li_d\text{-}C_eFe_fSi_cO_3 + y\cdot PbO \quad \text{(I), and}$$

wherein
A is selected from the group consisting of La, Nd, Y, Eu, Gd, Tb, Dy, Ho, Er and Yb,
B is selected from the group consisting of Na, K and Ag,
C is selected from the group consisting of Ni, Cu, Co and Mn, and
$0<a<0.12$,
$0.05\leq x\leq 0.3$,
$0\leq b<0.12$,
$0\leq c<0.12$,
$0\leq d<0.12$,
$0\leq e<0.12$,
$0\leq f<0.12$,
$0\leq y<1$, and
$b+d+e+f>0$.

2. The multi-layer capacitor according to claim 1, wherein L/B≥1 holds true.

3. The multi-layer capacitor according to claim 1, wherein L/H≥1 holds true.

4. The multi-layer capacitor according to claim 1, wherein the main body has third electrode layers that are electrically conductively connected to neither the first external contact-connection nor the second external contact-connection.

5. The multi-layer capacitor according to claim 4, wherein the third electrode layers overlap the first and second electrode layers.

6. The multi-layer capacitor according to claim 1, wherein each ceramic layer has a layer thickness of between 3 μm and 200 μm.

7. The multi-layer capacitor according to claim 1, wherein each first electrode layer has a layer thickness of between 0.1 μm and 10 μm, and wherein each second electrode layer has a layer thickness of between 0.1 μm and 10 μm.

8. The multi-layer capacitor according to claim 1, wherein the main body has at least 10 first electrode layers and at least 10 second electrode layers.

9. The multi-layer capacitor according to claim 1, wherein the following relationship holds true: number of first electrode layers/width B≥10/mm.

10. The multi-layer capacitor according to claim 1, wherein the first and second electrode layers comprise copper.

11. The multi-layer capacitor according to claim 1, wherein the first and second side surfaces are surface-treated.

12. The multi-layer capacitor according to claim 11, wherein the first and second side surfaces are lapped, ground or plasma-etched.

13. The multi-layer capacitor according to claim 1, wherein the first and second external contact-connections each have at least one sputtering layer in direct contact with the first or second electrode layers.

* * * * *